US009382016B2

(12) United States Patent
Loussides et al.

(10) Patent No.: US 9,382,016 B2
(45) Date of Patent: Jul. 5, 2016

(54) AIRCRAFT LANDING MONITOR

(71) Applicant: Sikorsky Aircraft Corporation, Stratford, CT (US)

(72) Inventors: George Nicholas Loussides, Branford, CT (US); Harshad S. Sane, Southbury, CT (US); Christopher Stathis, Hamden, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 14/732,953

(22) Filed: Jun. 8, 2015

(65) Prior Publication Data

US 2015/0367956 A1    Dec. 24, 2015

Related U.S. Application Data

(60) Provisional application No. 62/016,139, filed on Jun. 24, 2014.

(51) Int. Cl.
| | |
|---|---|
| *G05D 1/00* | (2006.01) |
| *G06G 7/70* | (2006.01) |
| *H04N 7/18* | (2006.01) |
| *B64D 45/04* | (2006.01) |
| *G05D 1/10* | (2006.01) |

(52) U.S. Cl.
CPC ............... *B64D 45/04* (2013.01); *G05D 1/102* (2013.01)

(58) Field of Classification Search
USPC ...................... 701/11, 18; 348/135
See application file for complete search history.

(56) References Cited

U.S. PATENT DOCUMENTS

| | | | |
|---|---|---|---|
| 8,600,589 B2 | 12/2013 | Mendez-Rodriguez et al. | |
| 8,608,107 B2 | 12/2013 | Martensson et al. | |
| 2010/0036551 A1* | 2/2010 | Lacaze | G01C 23/00 701/18 |
| 2010/0125382 A1* | 5/2010 | Wachenheim | G05B 19/416 701/18 |
| 2011/0106345 A1* | 5/2011 | Takacs | G05D 1/0676 701/17 |
| 2012/0200696 A1* | 8/2012 | Park | G01P 5/26 348/135 |

\* cited by examiner

*Primary Examiner* — Thomas G Black
*Assistant Examiner* — Tyler Paige
(74) *Attorney, Agent, or Firm* — Cantor Colburn LLP

(57) ABSTRACT

According to an aspect, a method of monitoring landing of an aircraft includes determining whether the aircraft is in a landing phase to maneuver the aircraft to a landing zone. Either or both of a landing profile monitor and a pattern matcher can set a landing instability indicator. The landing profile monitor compares aircraft sensor data indicative of a current state of the aircraft to a landing profile of the aircraft and sets the landing instability indicator based on the landing profile. The pattern matcher identifies a pattern associated with the landing zone in perception sensor data indicative of current conditions at the landing zone, monitors the pattern for a change indicative of landing zone instability, and sets the landing instability indicator based on detecting the change indicative of landing zone instability. Landing abort logic is triggered to abort landing based on determining that the landing instability indicator is set.

16 Claims, 3 Drawing Sheets

AIRCRAFT LANDING MONITOR

BACKGROUND OF THE INVENTION

The subject matter disclosed herein generally relates to landing of an aircraft, and more particularly to an aircraft landing monitor to abort landing of an aircraft.

Optionally-piloted vehicles (OPVs) and unmanned aerial vehicles (UAVs) can operate without a human pilot using autonomous controls. As OPVs and UAVs become more prevalent, they are being operated in less restricted and controlled areas. The transition from air to ground during a landing maneuver of an airborne vehicle is considered one of the riskier maneuvers to complete. There is greater chance for vehicle rollover and blade strike as the vehicle descends closer to a landing zone. In the currently art, a landing zone that has been selected is typically assumed to be a stable and structurally sound area. If the landing zone assessment is inaccurate, vehicle damage may result.

BRIEF DESCRIPTION OF THE INVENTION

According to an aspect of the invention, a method of monitoring landing of an aircraft includes determining whether the aircraft is in a landing phase to maneuver the aircraft to a landing zone. Either or both of a landing profile monitor and a pattern matcher can set a landing instability indicator based on determining that the aircraft is in the landing phase. The landing profile monitor compares aircraft sensor data indicative of a current state of the aircraft to a landing profile of the aircraft and sets the landing instability indicator based on the landing profile. The pattern matcher identifies a pattern associated with the landing zone in perception sensor data indicative of current conditions at the landing zone for the aircraft, monitors the pattern for a change indicative of landing zone instability, and sets the landing instability indicator based on detecting the change indicative of landing zone instability. Landing abort logic is triggered to abort landing of the aircraft based on determining that the landing instability indicator is set.

In addition to one or more of the features described above or below, or as an alternative, further embodiments could include where aircraft sensor data are measured values related to vertical positioning of the aircraft.

In addition to one or more of the features described above or below, or as an alternative, further embodiments could include where the landing profile maps engine speed and engine load torque relative to a flight envelope.

In addition to one or more of the features described above or below, or as an alternative, further embodiments could include where the aircraft sensor data include a weight-on-wheels value. The instability between the aircraft sensor data and the landing profile can include observing an increase in the weight-on-wheels value followed by a decrease in the weight-on-wheels value as the aircraft moves closer to the landing zone.

In addition to one or more of the features described above or below, or as an alternative, further embodiments could include where the perception sensor data are received from one or more image sensors, and image pattern matching is performed to identify and monitor the pattern.

In addition to one or more of the features described above or below, or as an alternative, further embodiments could include where the image pattern matching is performed over an observation area that is larger than the landing zone.

In addition to one or more of the features described above or below, or as an alternative, further embodiments could include where a probe extending from the aircraft provides one or more of the aircraft sensor data and the perception sensor data.

In addition to one or more of the features described above or below, or as an alternative, further embodiments could include receiving position data for the aircraft, determining a position of the landing zone and the aircraft based on the position data, and setting the landing instability indicator based on identifying an unexpected change in position for one or more of the aircraft and the landing zone.

In addition to one or more of the features described above or below, or as an alternative, further embodiments could include where the aircraft is autonomously controlled during landing, and the aircraft maintains or increases altitude based on the triggering of the landing abort logic.

According to further aspects of the invention, a system for monitoring landing of an aircraft is provided. The system includes a processor and memory having instructions stored thereon that, when executed by the processor, cause the system to determine whether the aircraft is in a landing phase to maneuver the aircraft to a landing zone. Either or both of a landing profile monitor and a pattern matcher can set a landing instability indicator based on determining that the aircraft is in the landing phase. The landing profile monitor compares aircraft sensor data indicative of a current state of the aircraft to a landing profile of the aircraft and sets the landing instability indicator based on the landing profile. The pattern matcher identifies a pattern associated with the landing zone in perception sensor data indicative of current conditions at the landing zone for the aircraft, monitors the pattern for a change indicative of landing zone instability, and sets the landing instability indicator based on detecting the change indicative of landing zone instability. Landing abort logic is triggered to abort landing of the aircraft based on a determination that the landing instability indicator is set.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

In exemplary embodiments, a landing monitor is provided for an aircraft. The landing monitor monitors a landing zone for instability and triggers landing abort logic of the aircraft if instability is detected. For example, some landing zones may become unstable under the weight of the aircraft landing upon it. Landing zones may be subject to other problems, such as movement of objects or debris into a landing zone after it has been selected. Changes in environmental factors may also not be detected, such as strong wind gusts, until the aircraft is in the process of landing at a selected landing site. Monitoring of aircraft landing may be implemented in autonomous aircraft, such as optionally-piloted vehicles (OPVs) and unmanned aerial vehicles (UAVs), and/or may be provided to assist a human-piloted aircraft in landing at a selected landing zone.

Figure 1:
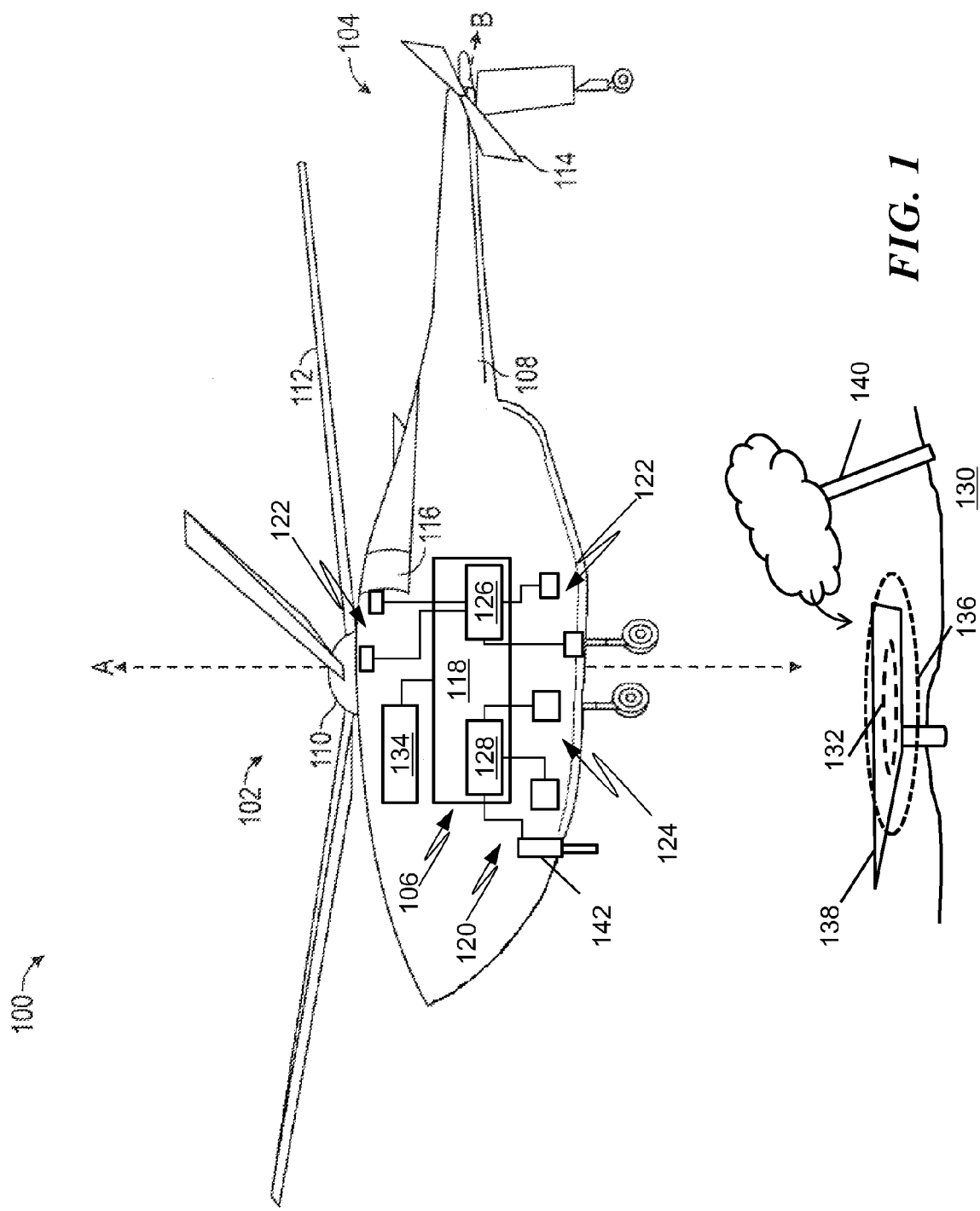
FIG. 1 is a perspective view of an exemplary rotary wing UAV aircraft according to an embodiment of the invention.

Referring now to the drawings, FIG. 1 illustrates a perspective of an exemplary vehicle in the form of an autonomous rotary-wing unmanned aerial vehicle (UAV) 100 (also referred to as "autonomous UAV 100" or "aircraft 100") for implementing aircraft landing monitoring according to an embodiment of the invention. As illustrated, the autonomous UAV 100 is an aircraft that includes a main rotor system 102, an anti-torque system, for example, a tail rotor system 104, and a landing monitoring system 106. The main rotor system 102 is attached to an airframe 108 and includes a rotor hub 110 having a plurality of blades 112 that rotate about axis A. Also, the tail rotor system 104 is attached aft of the main rotor system 102 and includes a plurality of blades 114 that rotate about axis B (which is orthogonal to axis A). The main rotor system 102 and the tail rotor system 104 are driven to rotate about their respective axes A, B by one or more turbine engines 116 through gearboxes (not shown). Although a particular configuration of an autonomous UAV 100 is illustrated as a rotary wing UAV and described in the disclosed embodiments, it will be appreciated that other configurations and/or machines include autonomous, semi-autonomous, and human-controlled vehicles that may operate in land or water including fixed-wing aircraft, rotary-wing aircraft, marine vessels (e.g., submarines, ships, etc.), and land vehicles (e.g., trucks, cars, etc.) for docking, parking, or autonomous positioning may also benefit from embodiments disclosed.

The landing monitoring system 106 includes an aircraft computer system 118 having one or more processors and memory to process sensor data acquired from a sensing system 120. The sensing system 120 may be attached to or incorporated within the airframe 108. The sensing system 120 includes one or more aircraft data sensors 122 and one or more perception sensors 124. The aircraft computer system 118 processes, in one non-limiting embodiment, raw data acquired through the sensing system 120 while the autonomous UAV 100 is airborne. An aircraft data processing system 126 interfaces with the aircraft data sensors 122, while a perception sensor processing system 128 interfaces with the perception sensors 124. The aircraft data processing system 126 and the perception sensor processing system 128 may be incorporated within the aircraft computer system 118 or implemented as one or more separate processing systems that are in communication with the aircraft computer system 118 as part of the landing monitoring system 106.

The aircraft data sensors 122 can include but are not limited to: weight-on-wheels sensors, engine speed sensors, engine torque sensors, rotor speed sensors, blade angle sensors, servo hydraulic pressure sensors, gyroscopes, accelerometers, an altimeter, and the like. Accordingly, the aircraft data sensors 122 can be used to detect a variety of current state values of the autonomous UAV 100, such as performance of the main rotor system 102, performance of the tail rotor system 104, performance of the turbine engines 116, altitude of the autonomous UAV 100, attitude of the autonomous UAV 100, and the like, while the autonomous UAV 100 is airborne and approaching a landing site.

The perception sensors 124 can capture image sensor data of a terrain 130 for processing by the aircraft computer system 118 while the autonomous UAV 100 is airborne. In an embodiment, the perception sensors 124 may include one or more of: a downward-scanning LIDAR scanner, a video camera, a multi-spectral camera, a stereo camera system, a structure light-based 3D/depth sensor, a time-of-flight camera, a LADAR scanner, a RADAR scanner, or the like in order to capture image sensor data indicative of the terrain 130 and identify one or more patterns associated with a landing zone 132 for the autonomous UAV 100. Image pattern matching can be performed by the perception sensor processing system 128 over an observation area 136 that is larger than the landing zone 132. Additionally, the autonomous UAV 100 may include a navigation system 134, such as, for example, an inertial measurement unit (IMU) that may be used to acquire positional data related to a current rotation and acceleration of the autonomous UAV 100 in order to determine a geographic location of autonomous UAV 100, including a change in position of the autonomous UAV 100. The navigation system 134 can also or alternatively include a global positioning system (GPS) or the like to enhance positional awareness of the autonomous UAV 100. The navigation system 134 in combination with the perception sensors 124 may be used to determine a position or geographic location of the landing zone 132. Additionally, a probe 142 extending from the autonomous UAV 100 may also provide aircraft sensor data and/or perception sensor data. For instance, the probe 142 may extend and retract to test for surface stability (e.g., ability to hold weight without moving) and/or moisture (e.g., water, snow, ice, etc.).

In exemplary embodiments, the aircraft computer system 118 of the landing monitoring system 106 monitors the current state of the autonomous UAV 100 and of the landing zone 132 during a landing maneuver. For example, the landing zone 132 may be located a structure 138 that could become unstable when weight of the autonomous UAV 100 is applied to the structure 138. The structure 138 may appear substantially flat from above, but the potential stability of the structure 138 may not be known until there is contact between the autonomous UAV 100 and the structure 138. Additionally, other objects 140 of the terrain 130 may not initially impede the landing zone 132 but may shift into close proximity or onto the landing zone 132 during a landing maneuver. By monitoring aircraft sensor data from the aircraft data sensors 122 and perception data from the perception sensors 124, the aircraft computer system 118 can make comparisons against a landing profile and monitor for pattern changes associated with the landing zone 132 that are indicative of landing zone instability. Upon detecting instability, the autonomous UAV 100 aborts a landing attempt and transitions into a failsafe mode, which may include hovering in place or increasing altitude.

Figure 2:
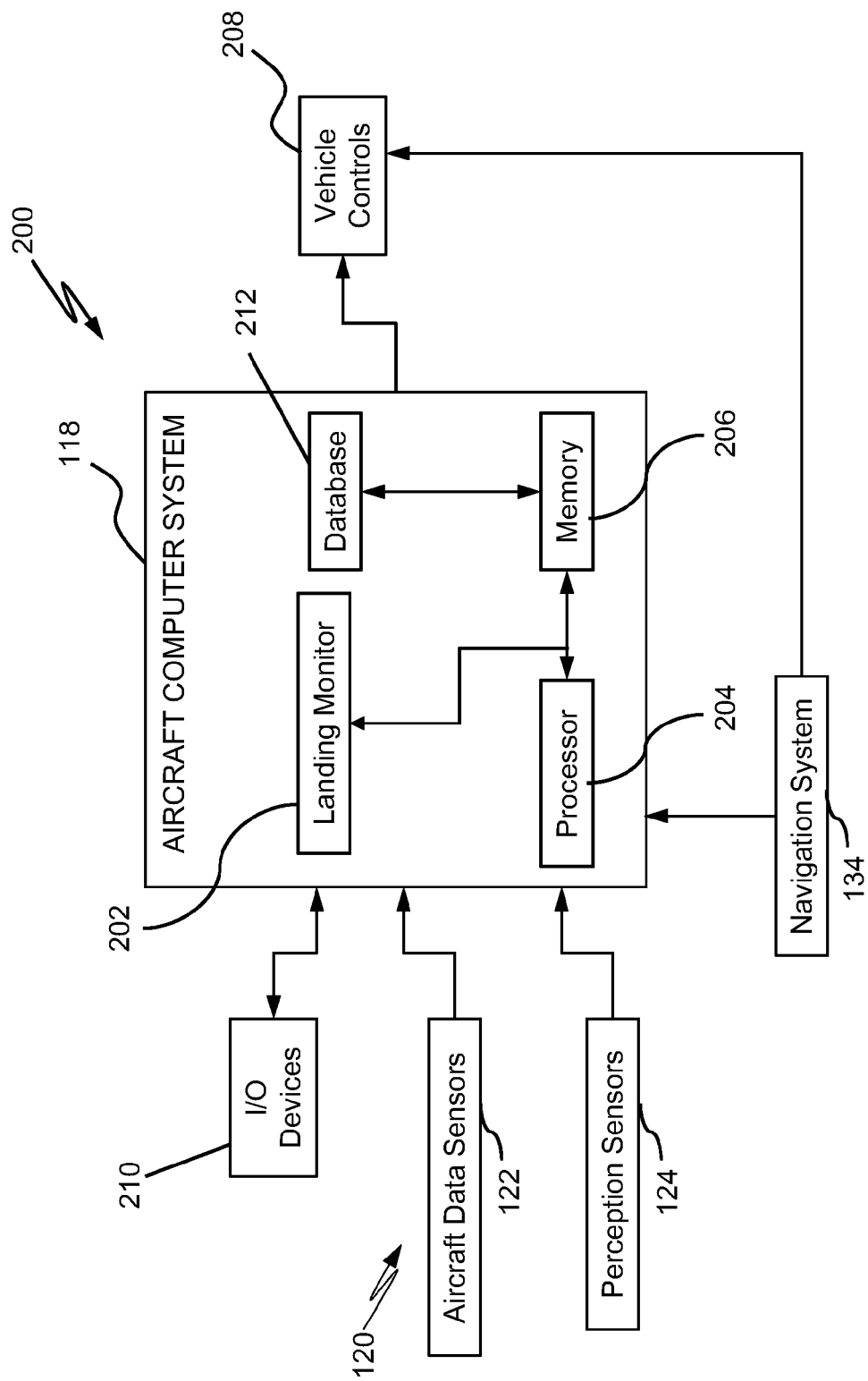
FIG. 2 is a schematic view of an exemplary computing system according to an embodiment of the invention.

FIG. 2 illustrates a schematic block diagram of a system 200 for landing monitoring onboard the autonomous UAV 100 of FIG. 1 according to an exemplary embodiment. The system 200 is an embodiment of the landing monitoring system 106 of FIG. 1. As illustrated, the system 200 includes the aircraft computer system 118 that executes instructions for implementing a landing monitor 202. The aircraft computer system 118 receives raw sensor data for current aircraft state values from one or more aircraft data sensors 122 and perception sensor data indicative of current conditions at the landing zone 132 of FIG. 1 from one or more perception sensors 124. As depicted in FIG. 2, the aircraft computer system 118 includes a memory 206 that communicates with a processor 204. The memory 206 may store the landing monitor 202 as executable instructions that are executed by processor 204. The memory 206 is an example of a non-transitory computer readable storage medium tangibly embodied in the aircraft computer system 118 including executable instructions stored therein, for instance, as firmware. Also, in embodiments, memory 206 may include random access memory (RAM), read-only memory (ROM), or other electronic, optical, magnetic or any other computer readable medium onto which instructions and data are stored. The processor 204 may be any type of processor, including a general purpose processor, a digital signal processor, a microcontroller, an application specific integrated circuit, a field programmable gate array, or the like. Although depicted as singular blocks, the processor 204 and memory 206 can be distributed between multiple processing circuits and memory subsystems. In an embodiment, the processor 204 performs functions of the aircraft data processing system 126 (FIG. 1) and the perception sensor processing system 128 (FIG. 1).

The system 200 may include a database 212. The database 212 may be used to store landing profiles, abort limits, position data from navigation system 134, pattern profiles, and the like. The data stored in the database 212 may be based on one or more other algorithms or processes for implementing the landing monitor 202. For example, in some embodiments data stored in the database 212 may be a result of the processor 204 having subjected data received from the sensing system 120 to one or more filtration processes. The database 212 may be used for any number of reasons. For example, the database 212 may be used to temporarily or permanently store data, to provide a record or log of the data stored therein for subsequent examination or analysis, etc. In some embodiments, the database 212 may store a relationship between data, such as one or more links between data or sets of data acquired through the modalities onboard the autonomous UAV 100.

The system 200 may provide one or more controls, such as vehicle controls 208. The vehicle controls 208 may provide directives based on, e.g., data associated with the navigation system 134. Directives provided by the vehicle controls 208 may include navigating or repositioning the autonomous UAV 100 of FIG. 1 to an alternate landing zone after an aborted landing. The directives may be presented on one or more input/output (I/O) devices 210. The I/O devices 210 may include a display device or screen, audio speakers, a graphical user interface (GUI), etc. In some embodiments, the I/O devices 210 may be used to enter or adjust a linking between data or sets of data. It is to be appreciated that the system 200 is illustrative. In some embodiments, additional components or entities not shown in FIG. 2 may be included. In some embodiments, one or more of the components or entities may be optional. In some embodiments, the components or entities of the system 200 may be arranged or configured differently from what is shown in FIG. 2. For example, in some embodiments the I/O device(s) 210 may be commanded by vehicle controls 208, as opposed to being commanded by the processor 204. Additionally, the probe 142 of FIG. 1 may be provided as another input to the system 200.

Figure 3:
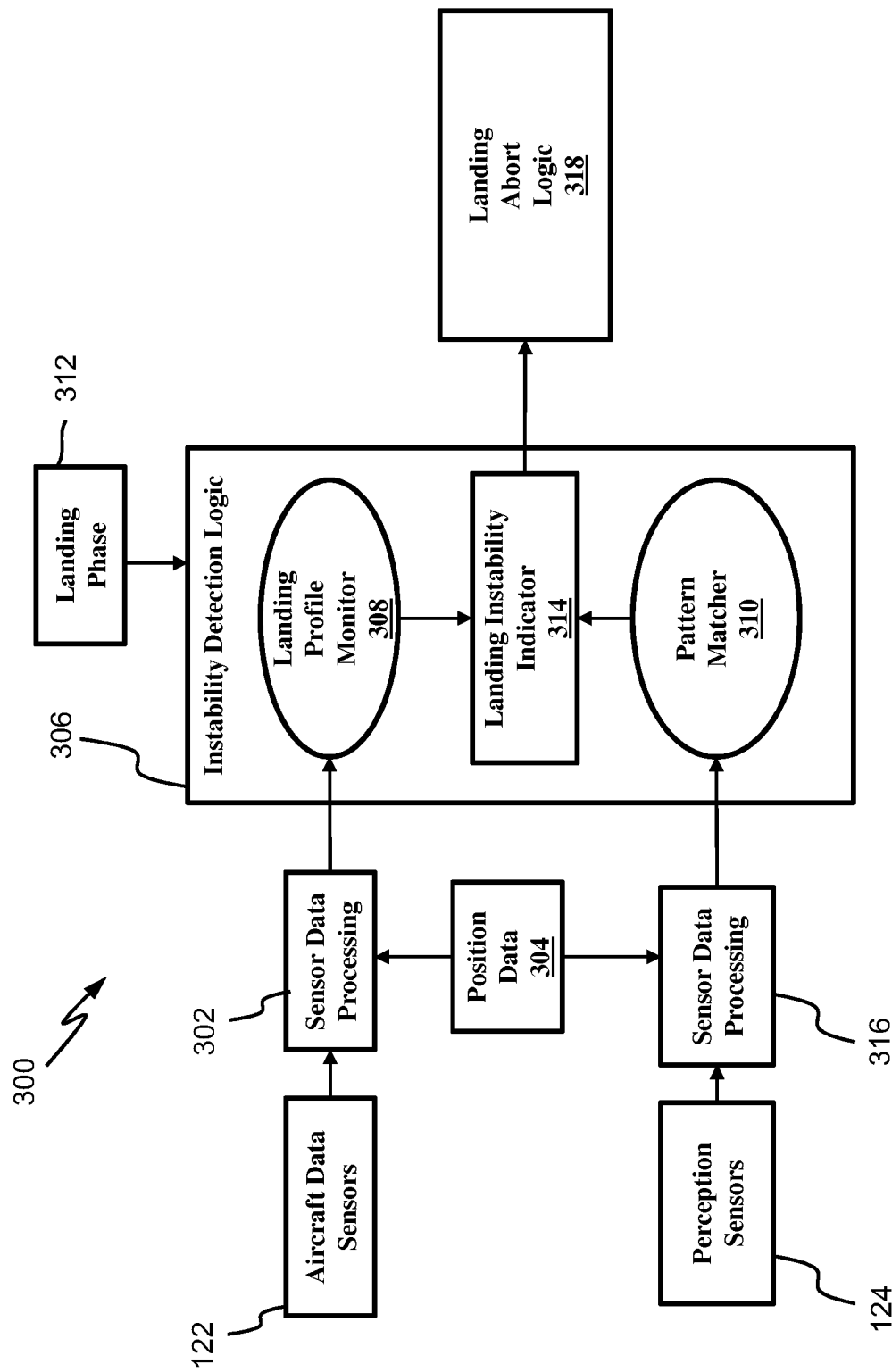
FIG. 3 illustrates a dataflow diagram of a landing monitor according to an embodiment of the invention.

FIG. 3 illustrates an exemplary data flow diagram 300 that is performed by the processor 204 of FIG. 2 for implementing the landing monitor 202 of FIG. 2 according to an embodiment. Aircraft sensor data indicative of a current state of the autonomous UAV 100 of FIG. 1 is received at sensor data processing 302 from the aircraft data sensors 122. The sensor data processing 302 may also receive position data 304, for example, from the navigation system 134 of FIGS. 1 and 2. Instability detection logic 306 can include either or both of a landing profile monitor 308 and pattern matcher 310. The landing profile monitor 308 is an example of processing performed by the aircraft data processing system 126 of FIG. 1. The sensor data processing 302 can provide the aircraft sensor data to the landing profile monitor 308.

The instability detection logic 306 can determine whether the autonomous UAV 100 of FIG. 1 is in a landing phase 312 to maneuver the autonomous UAV 100 of FIG. 1 to the landing zone 132 of FIG. 1. The current phase of the autonomous UAV 100 of FIG. 1 can be determined by other aircraft flight phase transition logic known in the art. The landing profile monitor 308 compares the aircraft sensor data to a landing profile of the autonomous UAV 100 of FIG. 1 based on determining that the autonomous UAV 100 of FIG. 1 is in the landing phase 312. The landing profile may be stored in the database 212 of FIG. 2. The landing profile monitor 308 can set a landing instability indicator 314 based on identifying an instability between the aircraft sensor data and the landing profile. The aircraft sensor data can include measured values related to vertical positioning of the autonomous UAV 100 of FIG. 1. The measured values related to vertical positioning can include aircraft vertical speed. The landing profile may define a number of maps that provide reference values for determining aircraft landing stability versus instability. For example, the landing profile can map engine speed and engine load torque relative to a flight envelope of the autonomous UAV 100 of FIG. 1. As another example, the aircraft sensor data can include a weight-on-wheels value. The instability between the aircraft sensor data and the landing profile may include observing an increase in the weight-on-wheels value followed by a decrease in the weight-on-wheels value as the autonomous UAV 100 of FIG. 1 moves closer to the landing zone 132 of FIG. 1. In other words, once an amount or percentage of weight of the autonomous UAV 100 of FIG. 1 is applied to the landing zone 132 of FIG. 1, the structure 138 of FIG. 1 may respond by shifting or crumbling, resulting in less weight applied to the landing zone 132 of FIG. 1. As a further example, a sudden change in aircraft pitch may occur when the autonomous UAV 100 of FIG. 1 applies weight to the landing zone 132 of FIG. 1. These movements and conditions can be detected by the instability detection logic 306.

In exemplary embodiments, perception sensor data indicative of current conditions at the landing zone 132 of FIG. 1 for the autonomous UAV 100 of FIG. 1 are also received at sensor data processing 316 from the perception sensors 124. The sensor data processing 316 may also receive position data 304, for example, from the navigation system 134 of FIGS. 1 and 2. The perception sensor data are provided to the pattern matcher 310. The pattern matcher 310 identifies a pattern associated with the landing zone 132 of FIG. 1 in the perception sensor data based on determining that the autonomous UAV 100 of FIG. 1 is in the landing phase 312. The pattern matcher 310 monitors the pattern for a change indicative of landing zone instability. The pattern matcher 310 can set the landing instability indicator 314 based on detecting the change indicative of landing zone instability, such as sudden change in position, shape, or orientation. Therefore, either or both of the landing profile monitor 308 and the pattern matcher 310 can set the landing instability indicator 314 for landing abort logic 318. The landing abort logic 318 is triggered to abort landing of the autonomous UAV 100 of FIG. 1 based on determining that the landing instability indicator 314 is set.

The perception sensor data may be received from one or more image sensors, and image pattern matching can be performed to identify and monitor the pattern. The image pattern matching may be performed over the observation area 136 of FIG. 1, which is larger than the landing zone 132 of FIG. 1. By monitoring a larger area, encroachment of objects, such as object 140 of FIG. 1, can be detected before the landing zone 132 of FIG. 1 is breached, thereby providing the autonomous UAV 100 of FIG. 1 more time to abort the landing.

The position data 304 received for the autonomous UAV 100 of FIG. 1 may be used to determine a position of the landing zone 132 of FIG. 1 and of the autonomous UAV 100 of FIG. 1. The landing instability indicator 314 may be set by the instability detection logic 306 based on identifying an unexpected change in position for one or more of the autonomous UAV 100 of FIG. 1 and the landing zone 132 of FIG. 1. For example, if the landing zone 132 of FIG. 1 is located on a moving body, such as boat or vehicle, the position data 304 can register a relative or absolute change in position. As another example, if the landing zone 132 of FIG. 1 is located on an unanchored platform on a body of water, a strong gust of wind may shift both the landing zone 132 of FIG. 1 and the autonomous UAV 100 of FIG. 1. The changes in position can be observed and the stability impact quantified by the instability detection logic 306. The position data 304 may also be logged in the database 212 of FIG. 2.

As data are collected over a period of time, landing profiles can be modified to adjust relative stability thresholds in the database 212 of FIG. 2. Stable/unstable classification of particular landing zones can also be logged to assist landing zone selection logic (not depicted).

The autonomous UAV 100 of FIG. 1 can be autonomously controlled during landing using the vehicle controls 208 of FIG. 2. The autonomous UAV 100 of FIG. 1 can maintain or increase altitude based the triggering of the landing abort logic 318. The landing abort logic 318 can also trigger landing zone selection logic (not depicted) to determine a next best location to land the autonomous UAV 100 of FIG. 1 after an abort.

Technical effects include monitoring landing of an aircraft, and triggering an abort of the landing based on determining that instability exists at the landing zone.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of monitoring landing of an aircraft, the method comprising:
   determining whether the aircraft is in a landing phase to maneuver the aircraft to a landing zone;
   setting, by a landing profile monitor, a landing instability indicator based on determining that the aircraft is in the landing phase, wherein the landing profile monitor compares aircraft sensor data indicative of a current state of the aircraft to a landing profile of the aircraft and sets the landing instability indicator based on the landing profile;
   setting, by a pattern matcher, the landing instability indicator based on determining that the aircraft is in the landing phase, wherein the pattern matcher identifies a pattern associated with the landing zone in perception sensor data indicative of current conditions at the landing zone for the aircraft, monitors the pattern for a change indicative of landing zone instability and sets the landing instability indicator based on detecting the change indicative of landing zone instability; and
   triggering landing abort logic to abort landing of the aircraft based on the landing instability indicator being set.

2. The method of claim 1, wherein aircraft sensor data are measured values related to vertical positioning of the aircraft.

3. The method of claim 1, wherein the landing profile maps engine speed and engine load torque relative to a flight envelope.

4. The method of claim 1, wherein the aircraft sensor data comprise a weight-on-wheels value, and instability between the aircraft sensor data and the landing profile comprises observing an increase in the weight-on-wheels value followed by a decrease in the weight-on-wheels value as the aircraft moves closer to the landing zone.

5. The method of claim 1, wherein the perception sensor data are received from one or more image sensors, and image pattern matching is performed to identify and monitor the pattern.

6. The method of claim 5, wherein the image pattern matching is performed over an observation area that is larger than the landing zone.

7. The method of claim 1, wherein a probe extending from the aircraft provides one or more of the aircraft sensor data and the perception sensor data.

8. The method of claim 1, further comprising:
   receiving position data for the aircraft;
   determining a position of the landing zone and the aircraft based on the position data; and
   setting the landing instability indicator based on identifying an unexpected change in position for one or more of the aircraft and the landing zone.

9. The method of claim 1, wherein the aircraft is autonomously controlled during landing, and the aircraft maintains or increases altitude based the triggering of the landing abort logic.

10. A system for monitoring landing of an aircraft, the system comprising:
    a processor; and
    memory having instructions stored thereon that, when executed by the processor, cause the system to:
    determine whether the aircraft is in a landing phase to maneuver the aircraft to a landing zone;
    set, by a landing profile monitor, a landing instability indicator based on determining that the aircraft is in the landing phase, wherein the landing profile monitor compares aircraft sensor data indicative of a current state of the aircraft to a landing profile of the aircraft and sets the landing instability indicator based on the landing profile;
    set, by the pattern matcher, the landing instability indicator based on determining that the aircraft is in the landing phase, wherein the pattern matcher identifies a pattern associated with the landing zone in perception sensor data indicative of current conditions at the landing zone for the aircraft, monitors the pattern for a change indicative of landing zone instability, and sets the landing instability indicator based on detecting the change indicative of landing zone instability; and
    trigger landing abort logic to abort landing of the aircraft based on the landing instability indicator being set.

11. The system of claim 10, wherein aircraft sensor data are measured values related to vertical positioning of the aircraft.

12. The system of claim 10, wherein the perception sensor data are received from one or more image sensors, and image pattern matching is performed to identify and monitor the pattern.

13. The system of claim 10, wherein a probe extends from the aircraft and provides one or more of the aircraft sensor data and the perception sensor data.

14. The system of claim 10, wherein the memory further comprises instructions stored thereon that, when executed by the processor, cause the system to:
    receive position data for the aircraft;

determine a position of the landing zone and the aircraft based on the position data; and set the landing instability indicator based on identification of an unexpected change in position for one or more of the aircraft and the landing zone.

15. The system of claim 11, wherein the aircraft is autonomously controlled during landing, and the aircraft maintains or increases altitude based the trigger of the landing abort logic.

16. A method of monitoring landing of an aircraft, the method comprising:

determining whether the aircraft is in a landing phase relative to a landing zone;

identifying a pattern associated with the landing zone in perception sensor data that is indicative of current conditions at the landing zone;

monitoring the pattern for a change indicative of landing zone instability;

setting an instability indicator based on detecting the change indicative of landing zone instability to trigger landing abort logic to abort landing of the aircraft.

* * * * *